(12) United States Patent
Vetere

(10) Patent No.: US 8,326,809 B2
(45) Date of Patent: Dec. 4, 2012

(54) SYSTEMS AND METHODS FOR DEFINING AND PROCESSING TEXT SEGMENTATION RULES

(75) Inventor: Peter Anthony Vetere, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 983 days.

(21) Appl. No.: 12/258,887

(22) Filed: Oct. 27, 2008

(65) Prior Publication Data

US 2010/0104188 A1    Apr. 29, 2010

(51) Int. Cl.
G06F 7/00 (2006.01)
G06F 17/00 (2006.01)
G06F 17/27 (2006.01)

(52) U.S. Cl. .......................................... 707/693; 704/9
(58) Field of Classification Search .................. 707/693; 704/9
See application file for complete search history.

(56) References Cited

U.S. PATENT DOCUMENTS

| | | | |
|---|---|---|---|
| 6,968,308 B1 * | 11/2005 | Brockett et al. | 704/9 |
| 7,324,936 B2 | 1/2008 | Saldanha et al. | |
| 7,356,463 B1 | 4/2008 | Isabelle | |
| 2004/0117192 A1 * | 6/2004 | Miletzki | 704/277 |
| 2005/0209844 A1 * | 9/2005 | Wu et al. | 704/2 |
| 2005/0261891 A1 * | 11/2005 | Chan et al. | 704/9 |
| 2006/0031207 A1 | 2/2006 | Bjarnestam et al. | |
| 2006/0047500 A1 * | 3/2006 | Humphreys et al. | 704/9 |
| 2006/0229865 A1 * | 10/2006 | Carlgren et al. | 704/8 |
| 2007/0021956 A1 * | 1/2007 | Qu et al. | 704/8 |
| 2007/0118356 A1 * | 5/2007 | Badino | 704/10 |
| 2007/0219773 A1 * | 9/2007 | Roux et al. | 704/1 |
| 2007/0244690 A1 * | 10/2007 | Peters | 704/8 |
| 2008/0154581 A1 * | 6/2008 | Lavi et al. | 704/9 |
| 2009/0089332 A1 * | 4/2009 | Harger et al. | 707/104.1 |

* cited by examiner

Primary Examiner — Jeffrey A Burke
(74) Attorney, Agent, or Firm — Jones Day

(57) ABSTRACT

Computer-implemented methods and systems are provided for text segmentation of textual data. Rules are accessed that define how the input stream is to be segmented into textual data elements through pattern matching. The one or more rules are applied to the input stream to determine the textual data elements in the input stream which are then provided as output.

16 Claims, 11 Drawing Sheets

Fig. 6A

| Method | Regular Expression | Vocabulary | Category | Prerequisite Condition | Output Flags | Chop Mode | Notes |
|---|---|---|---|---|---|---|---|
| Vocab | | JA.JPN Address | OSAKA | SEARCH_PREF | SEARCH_CITY, FOUND_OSAKA, SEARCH_TOWN | After | Chop after OSAKA and set flag to indicate we have found it |
| Vocab | | JA.JPN Address | KYOTO | SEARCH_PREF | SEARCH_CITY, SEARCH_TOWN, FOUND_KYOTO | After | Chop after KYOTO and set flag to indicate we have found it |
| Vocab | | JA.JPN Address | TOKYO | SEARCH_PREF | SEARCH_CITY, SEARCH_TOWN, FOUND_TOKYO | After | Chop after TOKYO and set flag to indicate we have found it |
| Vocab | | JA.JPN Address | HOKKAIDO | SEARCH_PREF | SEARCH_CITY, SEARCH_TOWN | After | Chop after HOKKAIDO |
| Vocab | | JA.JPN Address | PREFW_GFN | SEARCH_PREF | SEARCH_CITY, SEARCH_TOWN, FOUND_PREF | After | Chop after a prefecture name and set flag to indicate we have |
| Vocab | | JA.JPN Address | PREFI_FU | FOUND_OSAKA | FOUND_KYOTO | SEARCH_CITY, SEARCH_TOWN | After | Chop after FU if we have just found OSAKA or TOKYO |
| Vocab | | JA.JPN Address | PREFI_TO | FOUND_TOKYO | SEARCH_CITY, SEARCH_TOWN | After | Chop after TO if we have just found TOKYO |
| Vocab | | JA.JPN Address | PREFI_KEN | FOUND_PREF | SEARCH_CITY, SEARCH_TOWN | After | Chop after KEN if we have just found a general prefecture name |
| Vocab | | JA.JPN Address | CITY | SEARCH_CITY | SEARCH_TOWN, FOUND_CITY | After | Chop after city name and set flag indicating we have found a city name |
| Regex | [市区郡町村(区)] | | | FOUND_CITY | SEARCH_TOWN, FOUND_DIR | None | Set a flag indicating we have found a directional |
| Regex | [東西南北] | | | SEARCH_TOWN & (!FOUND_DIR) | SEARCH_TOWN, FOUND_DIR | Both | Chop a district indicator if we've just found a directional |
| Vocab | | JA.JPN Address | TOWN | FOUND_DIR & SEARCH_TOWN | FOUND_TOWN_1, SEARCH_TOWN_2 | Both | Chop before and after a town name if we've just found a direc |
| Vocab | | JA.JPN Address | TOWN | SEARCH_TOWN | FOUND_TOWN_1 | After | Chop after a town name and set flag indicating we found it |
| Regex | [町丁] | | | FOUND_TOWN_1 | FOUND_TOWN_1 | Both | Chop town indicator, ordinal, or directional if town name was |
| Regex | [甲乙丙丁戊己庚辛壬癸] | | | FOUND_TOWN_1 | | Both | Chop before and after Chinese ordinal character if town was |
| Regex | [町内] | | | FOUND_TOWN_1 | | After | Chop after CHOME |
| Vocab | | JA.JPN Address | TOWN | SEARCH_TOWN_2 | FOUND_TOWN_2 | Both | Chop after second town name |
| Regex | [市区郡町度座北] | | | FOUND_TOWN_2 | | Both | Chop town indicator, ordinal, or directional if second town was |
| Regex | [町内] | | | FOUND_TOWN_2 | | After | Chop after CHOME |
| Regex | [甲乙丙丁戊己庚辛壬癸] | | | FOUND_TOWN_2 | | Both | Chop before and after Chinese ordinal if second town name was |
| Regex | [市区郡町] | | | SEARCH_CITY | FOUND_CITY | Both | Chop city indicator. this is a low-priority rule; used only w |

MATCH TO FIG. 6B

MATCH TO FIG.6A

Input string:
兵庫県神戸市中央区北本町通1丁目1~28 JFE神戸ビル6F

Result:

| Phrase | Source |
|---|---|
| 兵庫 | None |
| 県 | Rules |
| 神戸 | Rules |
| 市 | Rules |
| 中央 | Rules |
| 区 | Rules |
| 北本 | Implicit |
| 町 | Implicit |
| 通 | Implicit |
| 1 | Implicit |
| 丁目 | Implicit |
| 1 | Implicit |
| ~ | Implicit |
| 28 | Implicit |
| JFE神戸ビル | Implicit |
| 6 | Implicit |
| F | Implicit |

Go  Clear

Locale: Japanese (Japan)

SYSTEMS AND METHODS FOR DEFINING AND PROCESSING TEXT SEGMENTATION RULES

TECHNICAL FIELD

The technology described herein relates generally to systems and methods for processing textual data. More specifically, the technology described herein relates to performing text segmentation.

BACKGROUND

For written natural languages, it can be difficult to programmatically break phrases into meaningful elements, a process known as text segmentation. This is evident in any language and is particularly evident when trying to parse such languages as Korean, Japanese, or other Asian languages where fixed word delimiters (e.g., "white-space") are typically not used. The written symbols of such languages represent spoken syllables, and a reader is required to understand the meaning and context of the surrounding symbols in order to derive the meaning of a given phrase. Additionally, text segmentation can pose a unique and difficult problem for natural language processing systems, because comprehending languages typically requires an extensive corpus of knowledge specific to the language being processed. This lexicon can be challenging and expensive to obtain, and it is usually massive in size.

SUMMARY

In accordance with the teachings herein, computer-implemented systems and methods are provided to process input textual data and segment such data. As an illustration, a computer-implemented method and system are provided for context-sensitive text segmentation of textual data. Rules are accessed that define how the input stream is to be segmented into textual data elements through pattern matching. The one or more rules are applied to the input stream to determine the textual data elements in the input stream which are then provided as output.

As another example, a computer-implemented method and system are provided for integrating textual data from disparate data sources in order to have data standardization with respect to the textual data. An input stream of textual data is received from one or more of the disparate data sources. The input stream of textual data is related to a predetermined category. One or more character-level rules are accessed that are related to the predetermined category and that define how the input stream is to be segmented into textual data elements through pattern matching. The one or more rules are applied to the input stream to determine the textual data elements in the input stream. The textual data elements are provided to a morphological parser. The morphological parser provides semantic analysis of the textual data elements for use in integrating the textual data elements in order to have data standardization with respect to the textual data.

As yet another example, a computer-implemented system and method are provided to process input textual data and segment such data in a context-sensitive manner, without the need to have delimiter characters present in the textual data. If a user wished to process a large amount of textual data consisting of Korean characters, which text does not include delimiter characters, a text segmentation system allows the user to nonetheless segment the text on the basis of rules the user defines. Once the input textual data is segmented, the output textual data elements may then be further analyzed by known methods.

BRIEF DESCRIPTION OF THE DRAWINGS

FIG. 6 is an example user interface to a text segmentation system.

DETAILED DESCRIPTION

Figure 1:
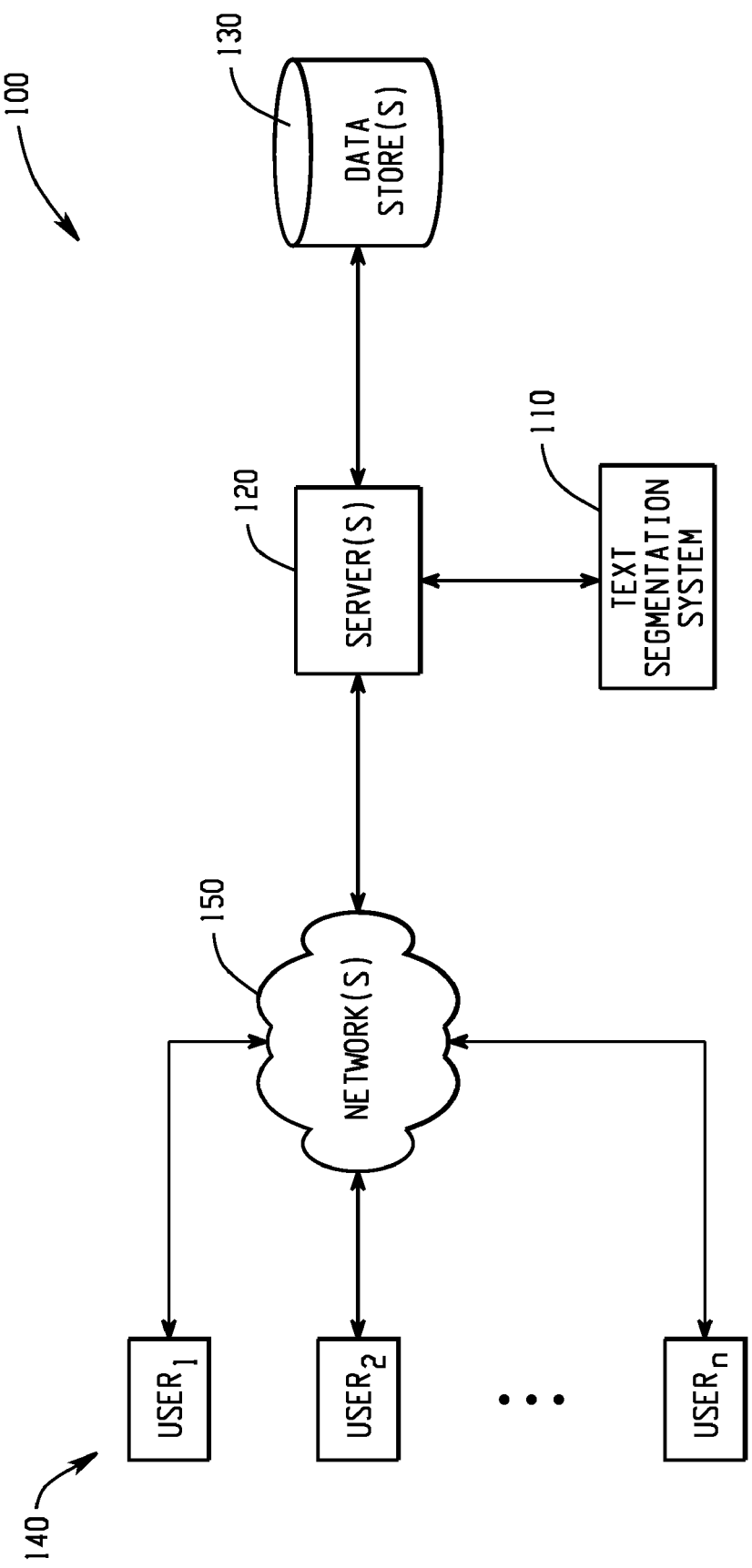
FIG. 1 is a block diagram depicting an environment in which users can interact with a text segmentation system.

FIG. 1 depicts at 100 an environment in which one or more users can interact with a text segmentation system 110. A text segmentation system 110 allows a user to define context-sensitive rules for splitting input textual data into semantic elements (or "tokens"). A natural language processing system may apply those context-sensitive rules quickly and accurately as a pre-processing technique for large lists of input textual data.

A text segmentation system 110 may be executed on one or more servers 120. The one or more servers 120, in turn, may be connected to one or more data stores 130, which may store the input, output, or both of the text segmentation system 110. Users 140 may access the text segmentation system 110 over one or more networks 150 that are linked to the one or more servers 120 on which the text segmentation system 110 executes.

Figure 2:
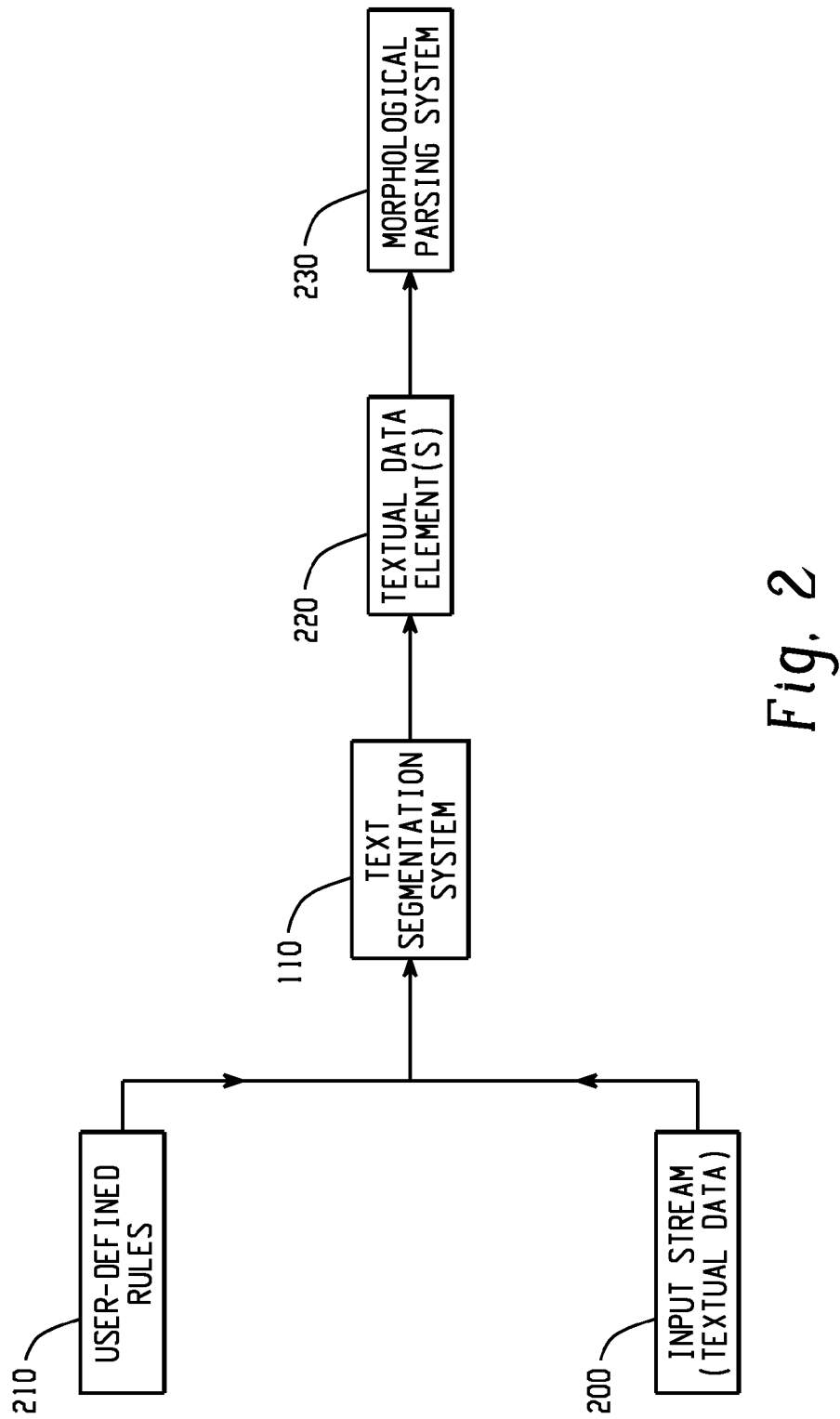
FIG. 2 is a block diagram depicting elements of an example text segmentation system.

As depicted in FIG. 2, a text segmentation system 110 accepts as input an input stream of textual data 200, which as an example, may take the form of a single input character string. The input stream 200 may be generated or derived from any generally known source, such as a data analysis application, retrieval from a database lookup, or entry by a user. Further, a text segmentation system 110 does not limit the input character string to a particular type of written language. The example text segmentation system 110 also accepts as input user-defined rules 210, which guide the text segmentation system 110 in segmenting text from the input stream 200.

The output produced by the example text segmentation system 110 is one or more textual data elements 220. These data elements 220 represent the "segments" produced by the text segmentation system's application of the user-defined rules 210 to the input stream 200. The textual data elements 220 may form the output from the text segmentation system 110 and be passed as input to a morphological parsing system 230, which may further process the data elements 220.

In order to process an input character string and produce output tokens, a text segmentation system 110 is configured with several parameters. First, the text segmentation system 110 defines a set of initial flags. The initial flags are variable names, and they serve to initialize the system with a predetermined state. Second, a user of the text segmentation system 110 provides an ordered set of segmentation rules. The example system may use any number of rules necessary to fully segment the input textual data, and each rule may consist of several different fields as discussed below.

Figure 3:
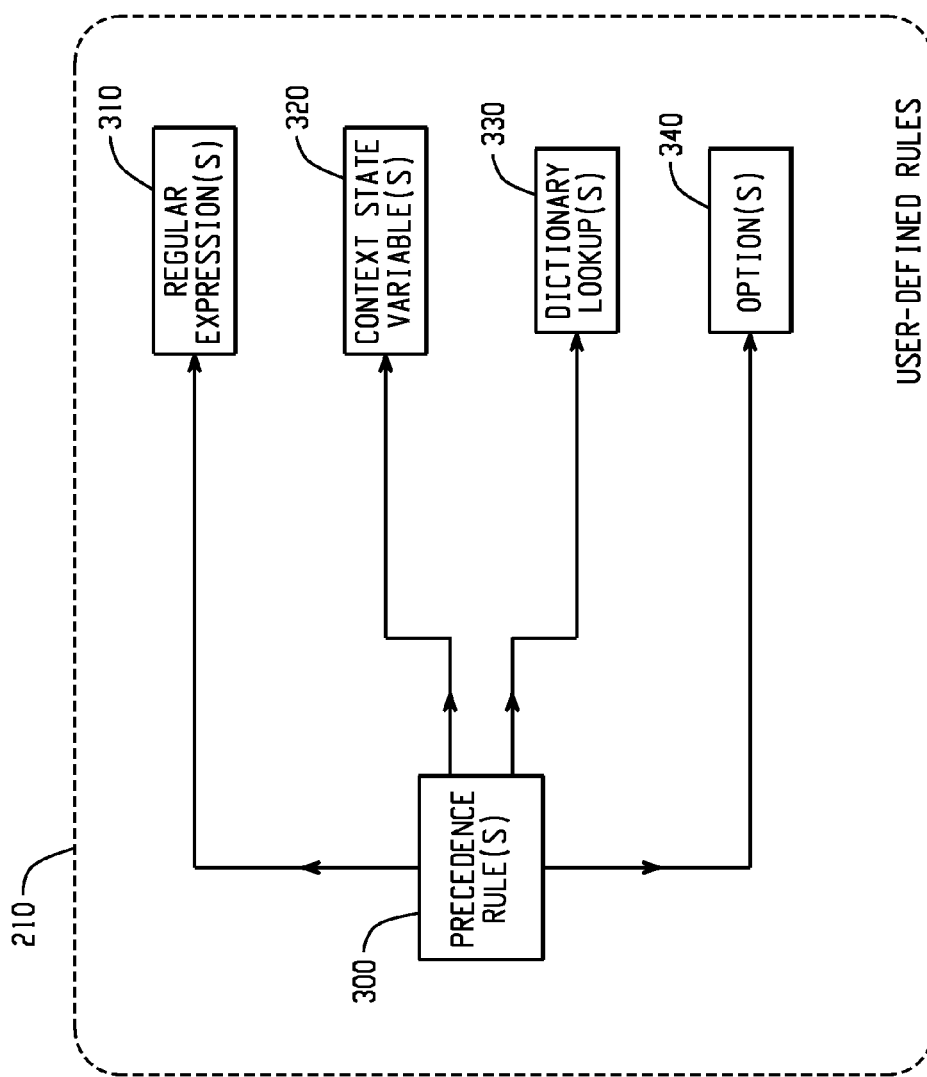
FIG. 3 is a block diagram depicting a structure of user-defined rules for controlling text segmentation in an example system.

As depicted in FIG. 3, user-defined rules 210 include a list of rules ordered by precedence 300. Each rule in the list may incorporate a number of fields, including a regular expression 310, context state variables 320, dictionary lookup 330, and option(s) 340. The context state variables 320 may include prerequisite flags and output flags. Examples of such flags could include SEARCH_CITY, FOUND_CITY, SEARCH_TOWN, FOUND_TOWN, SEARCH_STATE, FOUND_STATE, SEARCH_ZIP, and FOUND_ZIP in the case where an example system was used to parse data relating to addresses in the United States. In addition, each rule may include one or more options 340 that indicate a manner in which the rule is to be applied. For example, a rule could include an option indicating whether the rule should segment before or segment after. Such an option would indicate whether the input textual data should be segmented at a position before the text that matches the rule or at a position after the text that matches the rule. Use of an option like segment before/segment after gives a user of a text segmentation system additional controls that would allow the user to further adjust the manner in which the defined rules segment the input textual data.

The dictionary 330 and regular expression 310 fields are different ways of identifying matches within an input character string. A dictionary 330 could contain literal strings that the text segmentation system attempts to identify within the input character string. A regular expression 310 defines symbolically an acceptable set of strings for which a text segmentation system would search within the input character string. These regular expressions 310 could, for instance, take the form of known Perl-style regular expressions. Regardless of the approach used, though, the system may find that more than one rule in the list 300 applies at any given time. To disambiguate these situations, the system selects the longest matching substring within the character input string and, if more than one substring of the same length was matched, the system proceeds to select the top-most rule in the list 300 that produced one of the longest-matching substrings. The system maintains a set of context state variables 320, also called the flag state. These flags are Boolean variables, analogous to switches, and may either exist in a given state, or not. If used, these flags operate to determine the proper ordering and application of the user-defined text segmentation rules. For maximum flexibility in the segmentation of input textual data, rules are analyzed at the character level. This allows fine-grained control over the text segmentation process and also permits the application of the systems and methods described herein across a broad set of languages.

Figure 4:
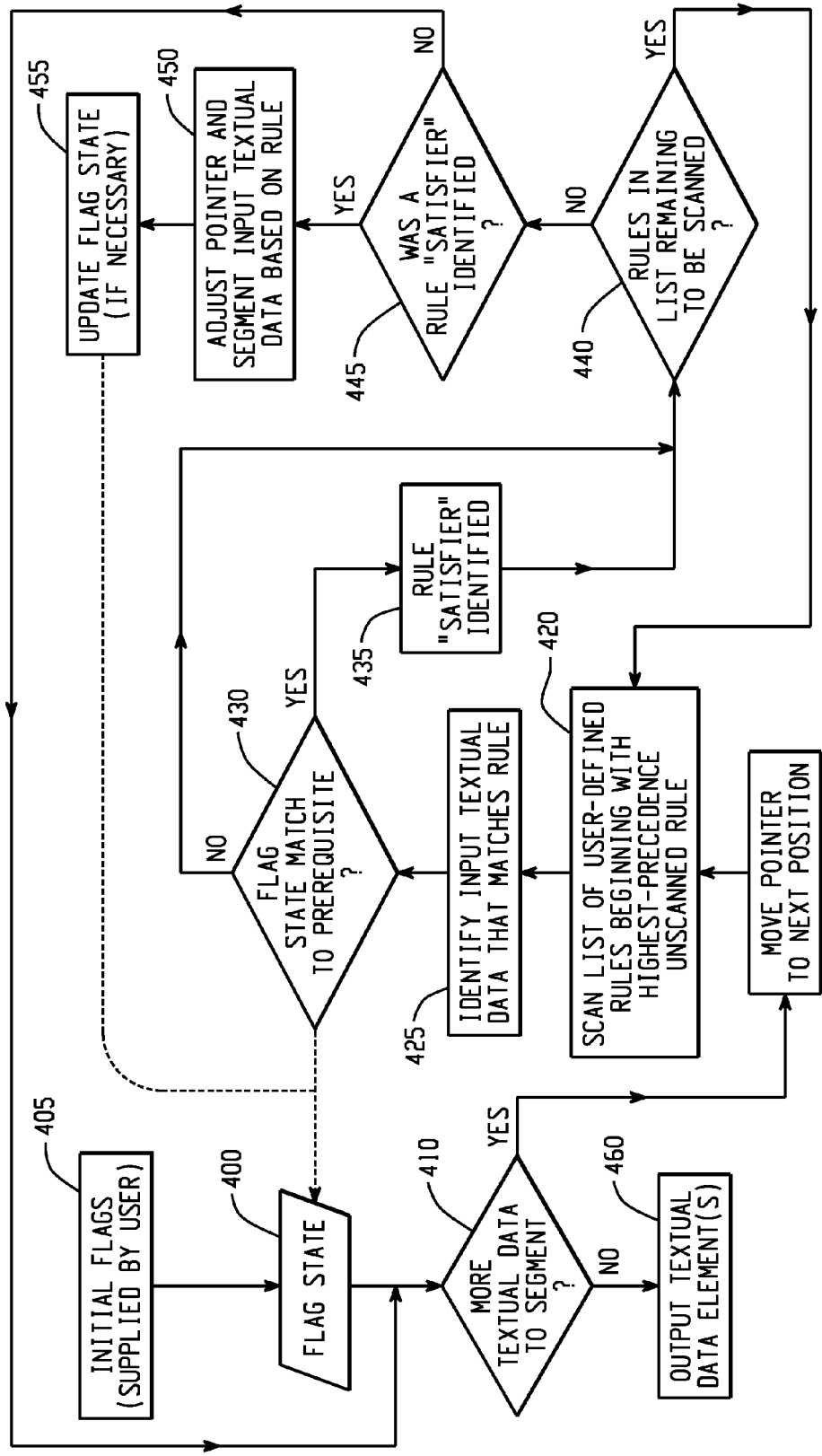
FIG. 4 is a flow diagram depicting an operational scenario of an example text segmentation system.

FIG. 4 depicts an operational scenario for text segmentation. As depicted in FIG. 4, the system initializes the flag state 400, using a set of initial flags 405 provided by the user. After the flag state 400 has been initialized, the system begins processing the input string, as shown at 410, by determining whether there is additional textual data in the input stream to be segmented. During this process, a pointer is moved from the beginning to the end of the string, as shown at 415, while checking each rule every time it is repositioned. At 420, once the pointer is repositioned, the entire list of rules is scanned—starting at the top and working toward the bottom—attempting to apply each rule's text match criteria to the substring at the current location.

Once a rule has successfully performed a textual match 425 (and its matching substring is longer than any previous match), the system checks at 430 the current flag state and evaluates it against the matching rule's prerequisite expression, using Boolean logic operators AND, OR, and NOT to test for a flag's existence. A true result means that the rule's input criteria have been satisfied and the rule becomes the "satisfier" for this input position, as shown at 435, until, possibly, a better satisfier is found further down in the rule list. At 440, if there are rules remaining in the list that have not yet been scanned, then the system returns to 420 and resumes scanning the rule list.

If no rules remain, the system determines at 445 whether a rule satisfier was identified by the system. In the event that no suitable satisfier was located for the current input position, the system returns to 410 to determine if there is additional text to be segmented, and if so, the system advances the pointer position on the input stream exactly one character toward the end of the stream and returns to 420 to scan the rule list at the new pointer position. If a satisfier was found, on the other hand, as shown at 450, the system positions the input pointer to the string position immediately following the last character of the matched substring and segments the input stream as discussed below. At 455, the system optionally sets its flag state to the configuration specified by the satisfier's output flags field. This may be implemented as an overwrite operation, so that if any input flags are to be preserved, they are reassigned using the satisfier's output flags. The system returns to 410 to determine whether the input stream contains additional text to be segmented and the process continues as described.

As part of step 450, the system determines from the rule that produced the satisfier how the system should segment the input string, given what it has learned from the matching process. To do this, the system checks the segment before and segment after options, which are optional. If neither is specified, no segmentation is performed for the current match. The actual segmentation process sets markers at specific character positions in the input character string. The segment before option instructs the system to place a marker before the first character of the substring matched by the current satisfier rule. Similarly, the segment after setting instructs the system to place a marker after the end of the last character of the matched substring. The settings for the segmentation flags may vary depending on the needs of the situation at hand and the structure of the match rules that are defined for a particular input character string. When the end of the input character string has been reached, the system then breaks the string into tokens using the segmentation markers that were created along the way.

Figure 5:
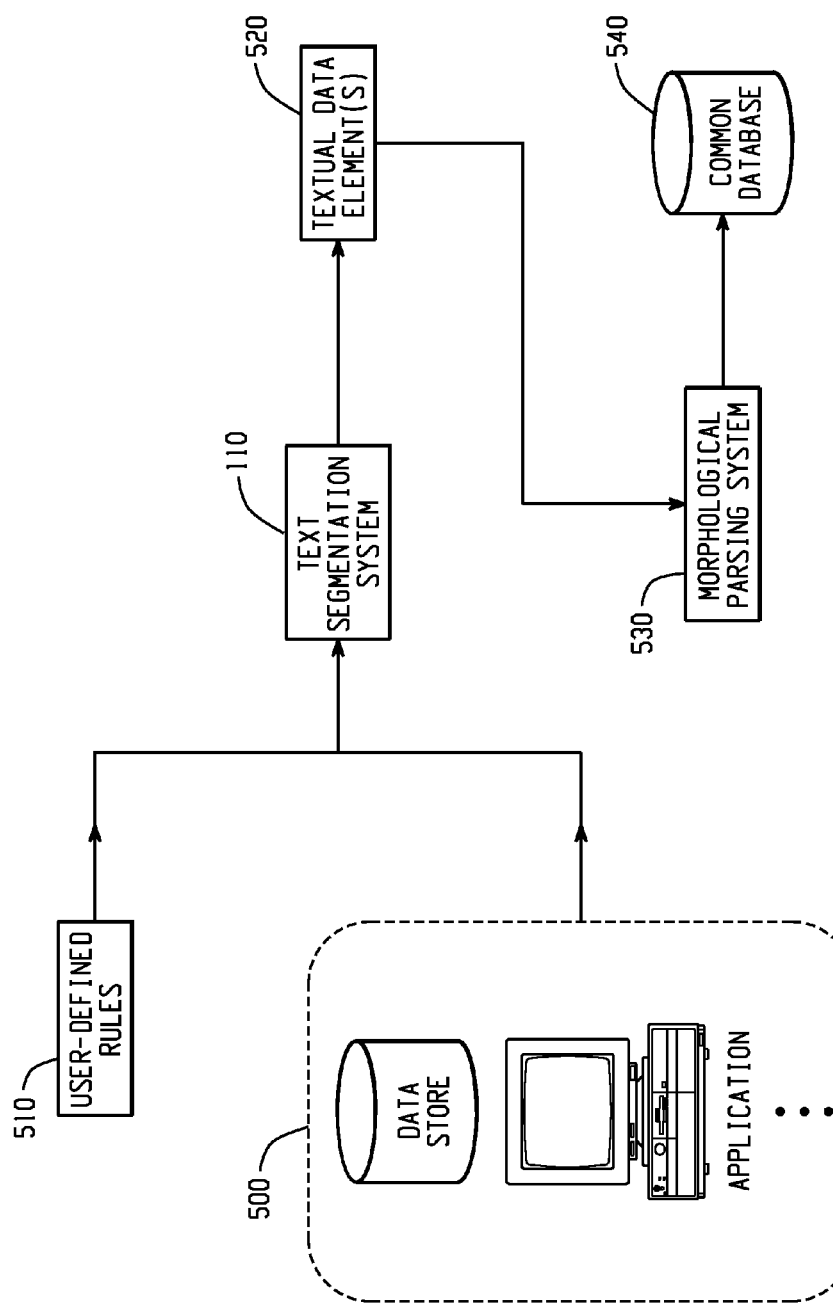
FIG. 5 is a block diagram depicting elements of an example text segmentation system.

FIG. 5 depicts an example of an operational scenario of a text segmentation system 110, which accepts as input both textual data from the disparate data sources 500 and user-defined rules 510. Because the sources are disparate, the format and other characteristics of the input data from the sources can greatly vary. For example, one source may use as its formatting standard for addresses the term "Rd." whereas another data source may use the term "Road" as its standard. In this operational scenario, text segmentation is to be performed upon the input data so that text data elements can be identified and made uniform before being incorporated into a common (e.g., single or unified) database. The disparate data sources 500 may include any type of medium capable of storing, generating, and/or transmitting textual data, such as text files, relational databases, data analysis applications, network-based applications, and even manually-input data.

The output produced by the text segmentation system 110 is one or more textual data elements 520. These data elements 520 represent the "segments" produced by the text segmentation system's application of the user-defined rules 510 to the input textual data. The textual data elements 520 may form the output from the text segmentation system 110 and be passed as input to a morphological parsing system 530, which may further process the data elements 520 from a semantic perspective. Further, the textual data elements 520 may be incorporated into a common database 540.

Thus, a text segmentation system may be used as part of a system designed to standardize textual data from disparate input sources and load the standardized data into a common database that then may be further utilized by users or other applications. The textual data elements 520 produced by the example text segmentation system also may be subjected to further analytical techniques. For example, a clustering algorithm can be used to analyze and categorize the textual data elements 520. Alternatively, or in conjunction with the above-described data analysis techniques, data identification techniques may be used to determine one or more data types represented within the textual data elements 520.

FIG. 6 depicts at 600 an example user interface to the text segmentation system. The user interface depicts fields that may make up the user-defined rules, including both dictionary lookup matching conditions, labeled as "Vocabulary" and regular expression patterns. As discussed previously, a text segmentation system may apply the rules in top-down order of precedence, analyzing whether the vocabulary or regular expression produces a match and whether any prerequisite condition is satisfied. If these conditions are satisfied, the input character string is segmented in accordance with the "Chop Mode" flag, and the listed output flags are written over the existing system flag. The user interface 600 also illustrates that a text segmentation system can be implemented to segment text from one or more predetermined category (e.g., an address location category, a name category, a phone number category, an occupation category, etc.) for use in populating different columns in a database (e.g., an address location column, a name column, a phone number column, an occupation column, etc.).

In the example, the category of textual data to be segmented is address location type data. The input textual data in the example contains Japanese characters. As mentioned previously, there are no language restrictions on the textual input, and the same is true with regard to predetermined categories. Any category of textual data may be segmented as described herein. In the example, the category is address data, but other types of personal data, such as names, telephone numbers, or government identification numbers could be segmented, as could categories such as financial or accounting data, positional coordinate data, or any other type of information that may be represented textually. In this way, the text segmentation system concerns itself with only a small subset of the entire language structure by focusing on a particular predetermined category of phrases, such as a collection of names or addresses. This obviates the need to accumulate or purchase a large lexicon of knowledge for these scenarios since such databases typically require large amounts of memory and disk space. Therefore in this operational scenario, the text segmentation system allows a user to define, for a specific category of phrases, segmentation and word categorization heuristics that can be passed into a natural language processing system.

As another example of a specific category of phrases, row 610 in the example user interface 600 shows a rule for segmenting textual data in Japanese characters that describes addresses in the Hokkaido prefecture. The rule causes the text segmentation system to search a vocabulary to attempt to find textual matches, and the prerequisite flag SEARCH_PREF indicates that this example includes a necessary precondition before a textual match may constitute a "satisfier." If the match does constitute a satisfier, then in this example, the output flags are used by the system to set the flag state. Also, the system is instructed to chop the input textual data after the HOKKAIDO match. Further, the example user interface 600 provides a user with the ability to add notes to each rule, so that, for example, a future user would be able to better understand the structure of the rules and their function and precedence.

Figure 7:
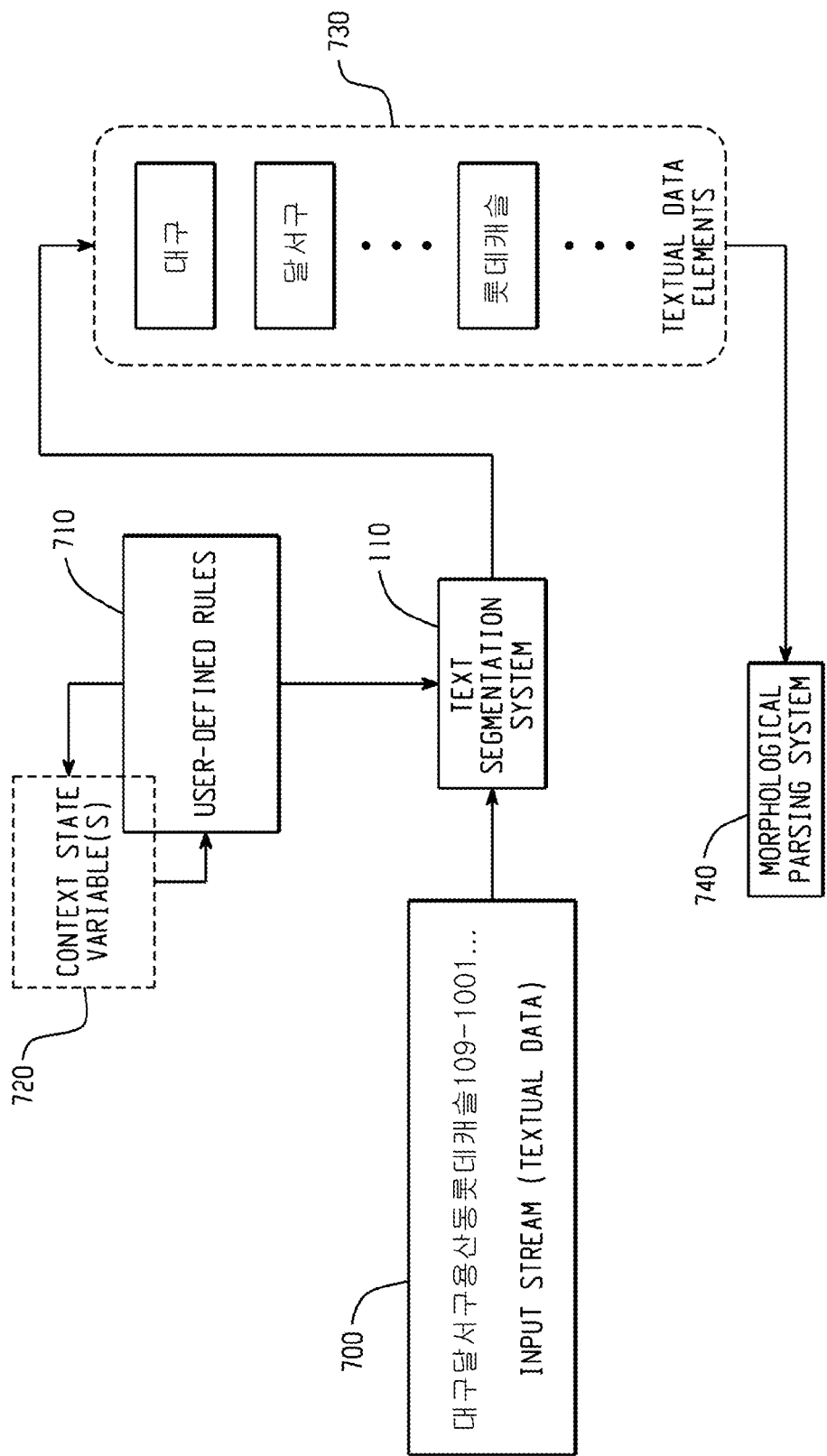
FIG. 7 is a block diagram depicting further the operation of an example text segmentation system.

FIG. 7 depicts an example operational scenario for a text segmentation system 110. In this example, the input stream of textual data 700 is a succession of Korean-language characters, which are not white-space delimited. The input stream 700 is input to the text segmentation system 110, which also accepts as input the user-defined rules 710, which are used in concert with the context state variables 720 to ensure that segmentation of the input stream 700 is performed in a context appropriate way. The result of the application of the user-defined rules 710 to the input stream 700 is a set of textual data elements 730. As depicted at 730, the elements may be of varying lengths, depending on the length of the substring match found by the system to satisfy a particular rule. The set of textual data elements 730 then may serve as input to a morphological parsing system 740. An example morphological parsing system 740 (such as within the dfPower Studio software application available from DataFlux) may perform semantic analysis on the set of textual data elements 730. The semantic analysis thus performed may be useful when, for instance, a user is attempting to standardize the data from the input stream 700.

Figure 8:
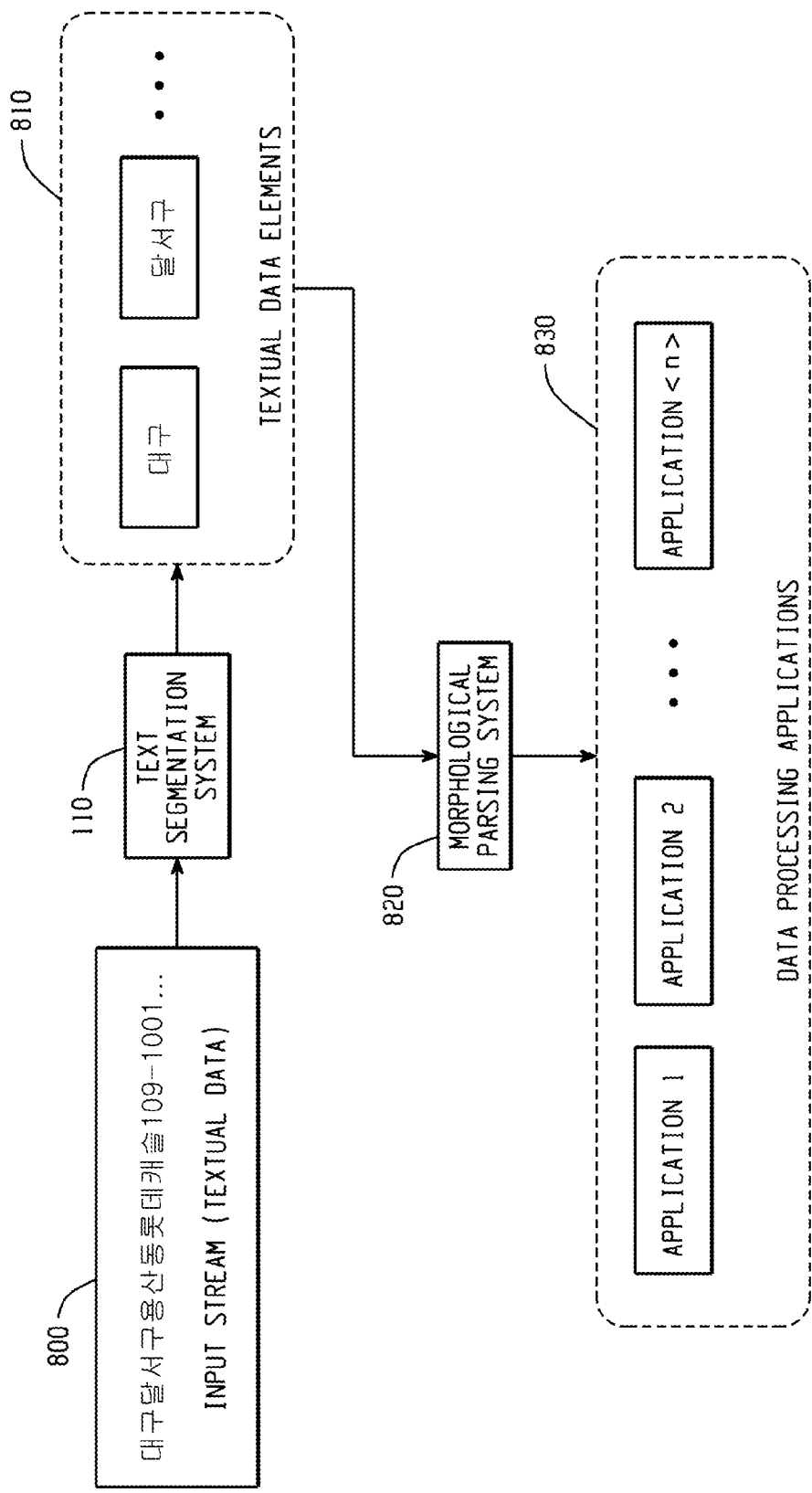
FIG. 8 is a block diagram depicting the integration of a text segmentation system into a data processing workflow.

FIG. 8 depicts another example of the integration of a text segmentation system 110 and a morphological parsing system 820. As before, an input stream of textual data 800 is input to the text segmentation system 110. The text segmentation system 110 applies user-defined rules to produce a set of one or more textual data elements 810. This set of textual data elements 810, then, may be used as the input to a morphological parsing system 820. The morphological parsing system 820 performs further analysis on the set of textual data elements, and the output of the morphological parsing system 820 may function as the input to one or more additional data processing applications 830. For example, if a user wished to create a data warehouse containing various types of data, including textual data, the output from the morphological parsing system could be input to an extract, transform, and load (ETL) process that would incorporate the textual data into the data warehouse. As another example, the output of the morphological parsing system 820 could become the input to a clustering algorithm that would be used to group together related data elements from the input stream 800.

Figure 9:
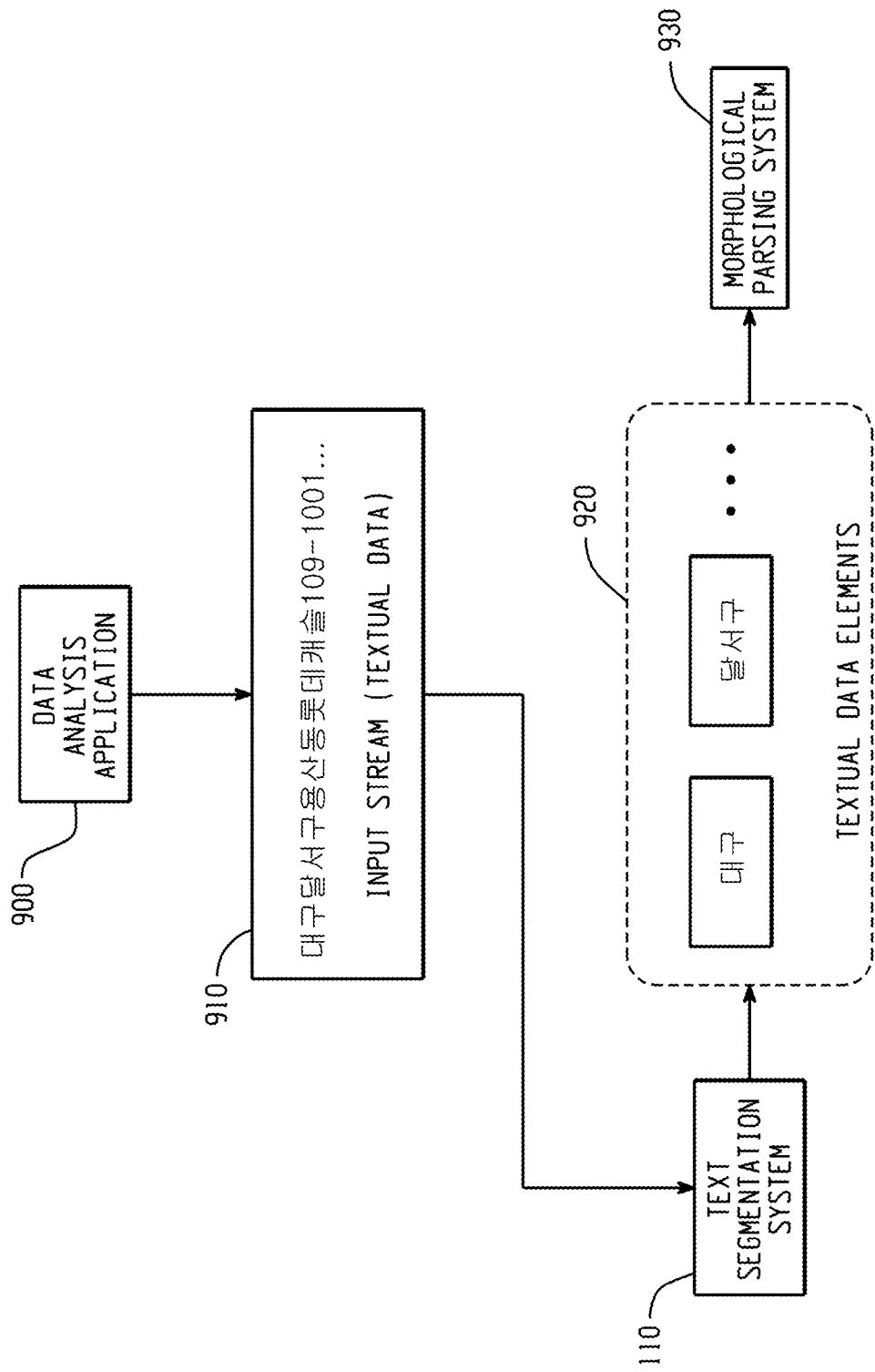
FIG. 9 is a block diagram depicting the integration of a text segmentation system and a data analysis application.

FIG. 9 depicts an example text segmentation system 110 in which the input to the system 110 is derived from a data analysis application 900. The data analysis application 900 is configured to produce output in the form of an input stream of textual data 910, which in turn forms the input to the example text segmentation system 110. As previously discussed, the text segmentation system 110 applies user-defined rules to generate a set containing one or more textual data elements

920. Further, a morphological parsing system 930 may then be used to further analyze the output set of textual data elements 920.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting.

Figure 10:
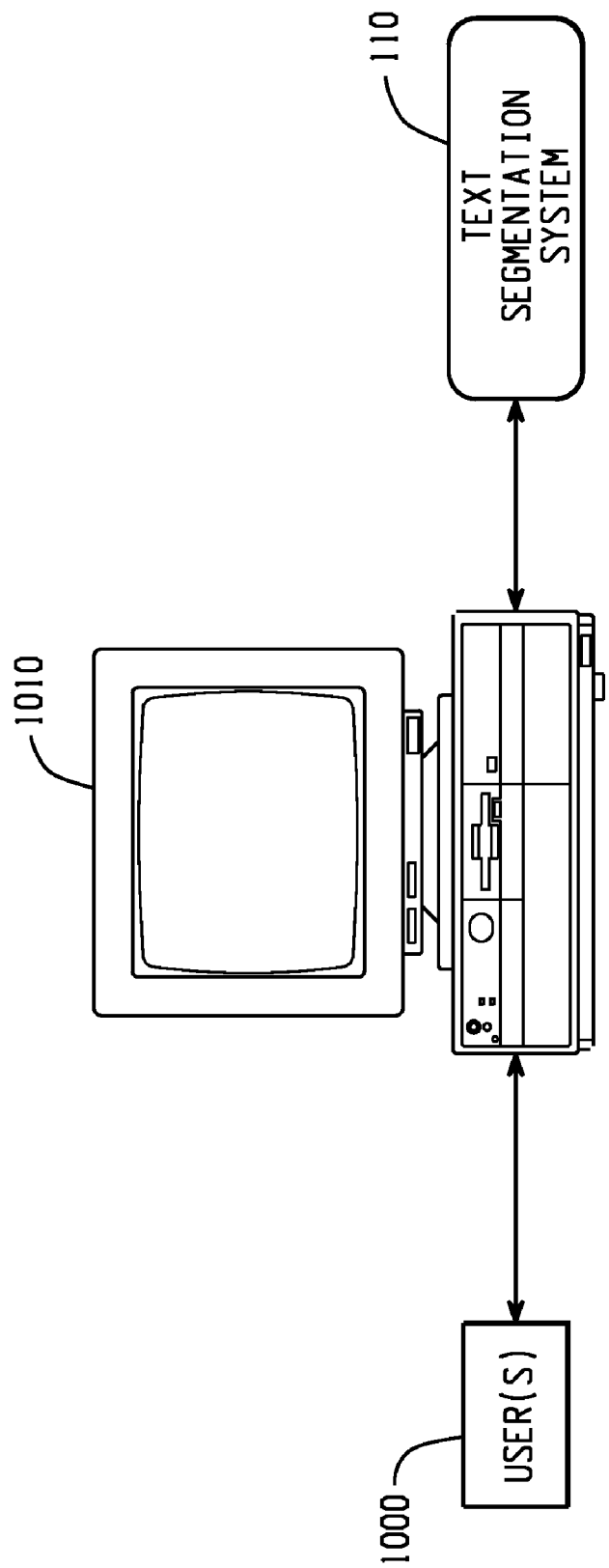
FIG. 10 is a block diagram depicting a single general-purpose computer environment wherein a user can interact with a text segmentation system.

It is further noted that the systems and methods may be implemented on various types of computer architectures, such as for example on a single general purpose computer (as shown at 1010 on FIG. 10) or workstation, operated by one or more users 1000, or on a networked system, or in a client-server configuration, or in an application service provider configuration.

Further, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

In addition, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for processing textual data, comprising:

receiving, using one or more data processors, an input stream of textual data, wherein the input stream includes a plurality of characters arranged in an order;

receiving, using the one or more data processors, an initial state for a plurality of context variables;

accessing, using the one or more data processors, a plurality of parsing rules including a regular expression rule and a dictionary list rule, wherein a parsing rule includes a search portion identifying search criteria for satisfying the parsing rule, a segmenting portion including a procedure for segmenting a portion of the input stream when the parsing rule is satisfied, and a context portion identifying adjustments to the context variables when the parsing rule is satisfied;

positioning, using the one or more data processors, a pointer at a position in the input stream;

evaluating, using the one or more data processors, the parsing rules using one or more characters at positions in the input stream after the pointer;

determining, using the one or more data processors, that a parsing rule is satisfied, wherein a regular expression rule is satisfied when the one or more characters match a symbolically defined string and the plurality of context variables meet a regular expression context criteria, and wherein the dictionary list rule is satisfied when the one or more characters match a literal string included in a dictionary list and the context variables meet a dictionary list context criteria;

segmenting, using the one or more data processors, the one or more characters according to the segmenting portion of the satisfied parsing rule;

generating, using the one or more data processors, textual data elements using the segmented characters;

adjusting, using the one or more data processors, the state of the plurality of context variables according to the context portion of the satisfied parsing rule; and outputting, using the one or more data processors, the textual data elements to a morphological parser.

2. The method of claim 1, further comprising:

advancing the pointer to a new position in the input stream; and generating additional textual elements by re-evaluating, re-determining, and the re-segmenting the one or more characters at positions in the input stream after the newly positioned pointer.

3. The method of claim 2, wherein the re-determining uses the adjusted state of the context variables.

4. The method of claim 1, wherein a precedence rule is applied when more than one parsing rule is satisfied.

5. The method of claim 4, wherein the precedence rule is based on a number of characters relied upon to satisfy the search criteria.

6. The method of claim 4, wherein the precedence rule is based on priorities assigned to the plurality of parsing rules.

7. The method of claim 1, wherein input streams are received from disparate data sources including a text file, a relational database, a data analysis application, and a network-based application.

8. The method of claim 1, wherein the input stream of textual data does not contain delimiters.

9. The method of claim 1, wherein the input stream of textual data includes words from an Asian language.

10. The method of claim 1, wherein the morphological parser provides semantic analysis of the textual data elements and standardization of the textual data.

11. The method of claim 1, wherein the textual data elements are stored in a common database.

12. The method of claim 1, wherein a clustering algorithm is used to analyze and categorize the textual data elements.

13. The method of claim 1, wherein data identification techniques are used to determine one or more data types of the textual data elements.

14. The method of claim 1, wherein the input stream of textual data is related to a predetermined category, and wherein the pre-determined category is an address location category, or a name category, or a phone number category, or an occupation category.

15. A computer-implemented system for processing textual data, comprising:
one or more data processors;
one or more computer-readable storage mediums containing instructions configured to cause the one or more processors to perform operations including:
receiving an input stream of textual data, wherein the input stream includes a plurality of characters arranged in an order;
receiving an initial state for a plurality of context variables;
accessing a plurality of parsing rules including a regular expression rule and a dictionary list rule, wherein a parsing rule includes a search portion identifying search criteria for satisfying the parsing rule, a segmenting portion including a procedure for segmenting a portion of the input stream when the parsing rule is satisfied, and a context portion identifying adjustments to the context variables when the parsing rule is satisfied;
positioning a pointer at a position in the input stream;
evaluating the parsing rules using one or more characters at positions in the input stream after the pointer;
determining that a parsing rule is satisfied, wherein a regular expression rule is satisfied when the one or more characters match a symbolically defined string and the plurality of context variables meet a regular expression context criteria, and wherein the dictionary list rule is satisfied when the one or more characters match a literal string included in a dictionary list and the context variables meet a dictionary list context criteria;
segmenting the one or more characters according to the segmenting portion of the satisfied parsing rule;
generating textual data elements using the segmented characters;
adjusting the state of the plurality of context variables according to the context portion of the satisfied parsing rule; and
outputting the textual data elements to a morphological parser.

16. A computer-program product for processing textual data, tangibly embodied in a machine-readable non-transitory storage medium, including instructions configured to cause a data processing apparatus to:
receive an input stream of textual data, wherein the input stream includes a plurality of characters arranged in an order;
receive an initial state for a plurality of context variables;
access a plurality of parsing rules including a regular expression rule and a dictionary list rule, wherein a parsing rule includes a search portion identifying search criteria for satisfying the parsing rule, a segmenting portion including a procedure for segmenting a portion of the input stream when the parsing rule is satisfied, and a context portion identifying adjustments to the context variables when the parsing rule is satisfied;
position a pointer at a position in the input stream;
evaluate the parsing rules using one or more characters at positions in the input stream after the pointer;
determine that a parsing rule is satisfied, wherein a regular expression rule is satisfied when the one or more characters match a symbolically defined string and the plurality of context variables meet a regular expression context criteria, and wherein the dictionary list rule is satisfied when the one or more characters match a literal string included in a dictionary list and the context variables meet a dictionary list context criteria;
segment the one or more characters according to the segmenting portion of the satisfied parsing rule;
generate textual data elements using the segmented characters;
adjust the state of the plurality of context variables according to the context portion of the satisfied parsing rule; and
output the textual data elements to a morphological parser.

* * * * *